April 28, 1964   M. T. DERBY   3,130,428
MEANS TO FEED AND TRANSPORT BLANKS DURING A THREADING OPERATION
Original Filed Jan. 12, 1959   3 Sheets-Sheet 1

INVENTOR.
MARSHALL T. DERBY
BY C. E. Stratton
ATTORNEY

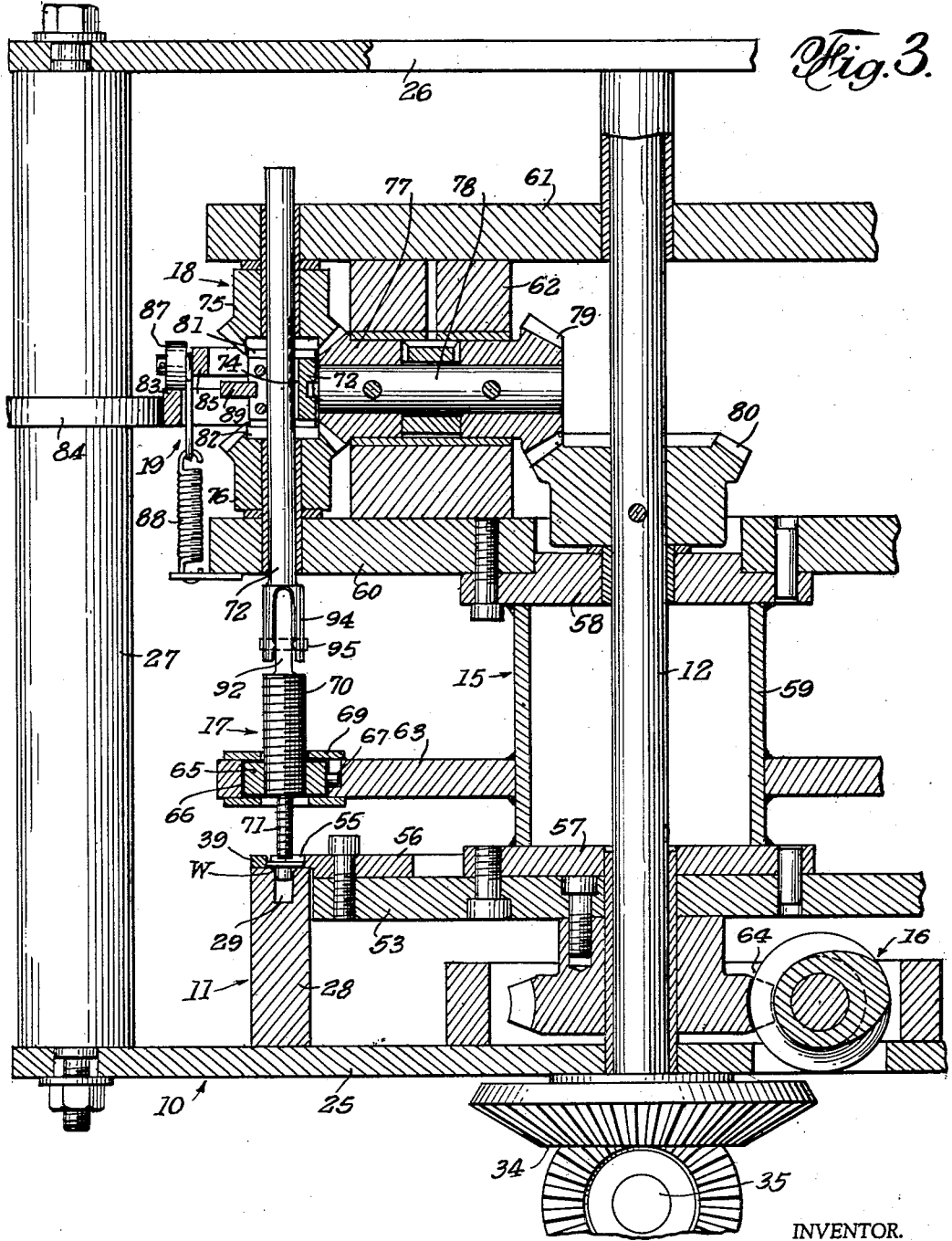

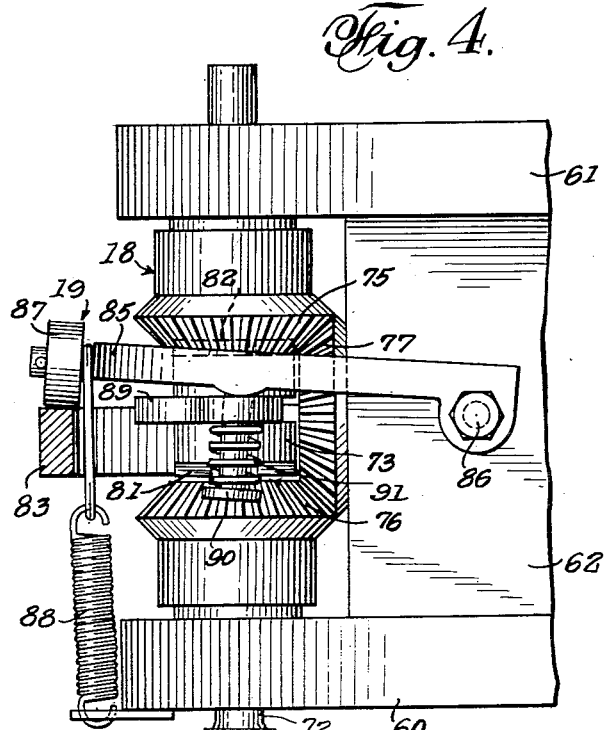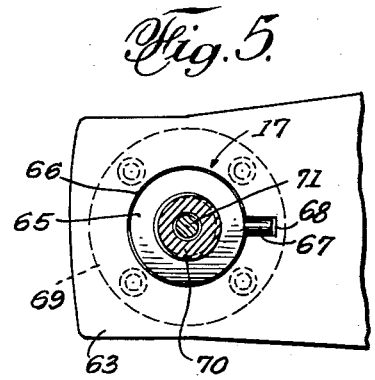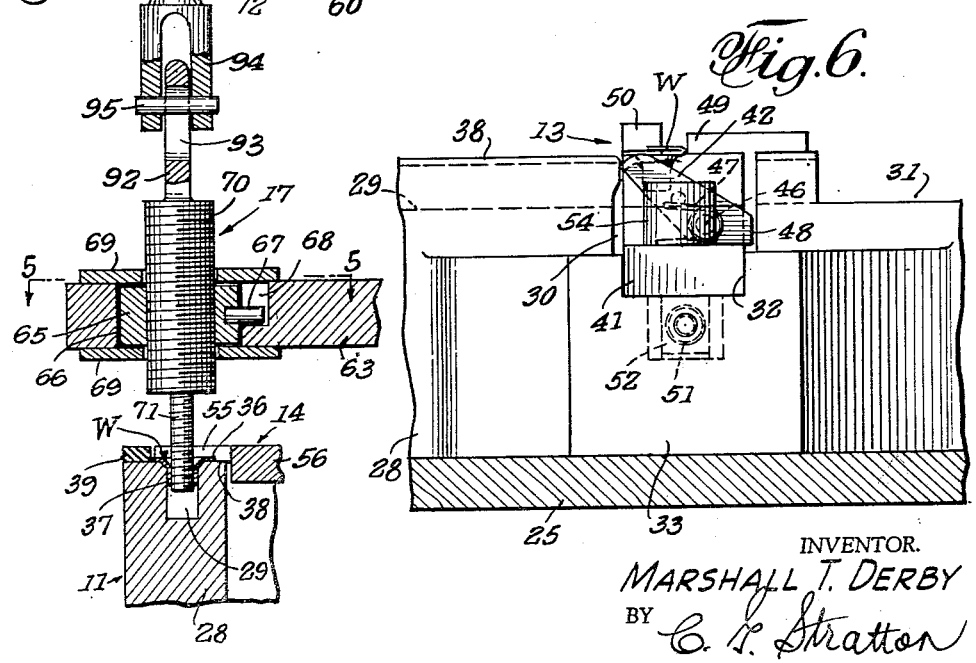

United States Patent Office 3,130,428
Patented Apr. 28, 1964

3,130,428
MEANS TO FEED AND TRANSPORT BLANKS DURING A THREADING OPERATION
Marshall T. Derby, Downey, Calif., assignor to California Industrial Products, Inc., Los Angeles, Calif., a corporation of California
Original application Jan. 12, 1959, Ser. No. 786,310, now Patent No. 3,058,128, dated Oct. 16, 1962. Divided and this application July 6, 1961, Ser. No. 122,294
3 Claims. (Cl. 10—132)

This invention relates to an automatic machine for carrying out swage-tapping operations and has for an object to provide a machine in which workpieces are continuously moved between feed and discharge stations and, while so moving, are tapped. Hence, the machine is characterized by high production coupled with space conservation, since tapping may be performed on several workpieces at the same time.

Another object of the invention is to provide a machine of the character referred to that slides workpieces along a circular trackway while tapping is being performed, and is held by said trackway against axial rotation both during feed of the tap and withdrawal thereof.

A further object of the invention is to provide a machine in which a plurality of tapping units are arranged to be moved around a common fixed center to achieve the mentioned space saving.

A still further object of the invention is to provide novel tapping means that provides for accommodation to misalignment between the tap and the workpiece, thereby insuring against undue wear and tap breakage.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 3 is a typical vertical sectional view showing one of the several swage-tapping units and the means for operating the same.

FIG. 4 is an enlarged side elevational view, with the lower part in vertical section, of one of said units at the bottom of its tapping operation and just prior to the withdrawal of the tap.

FIG. 5 is a cross-sectional view as taken on the line 5—5 of FIG. 4.

FIG. 6 is an enlarged elevational view as seen from the right side of FIG. 2.

Figure 1:
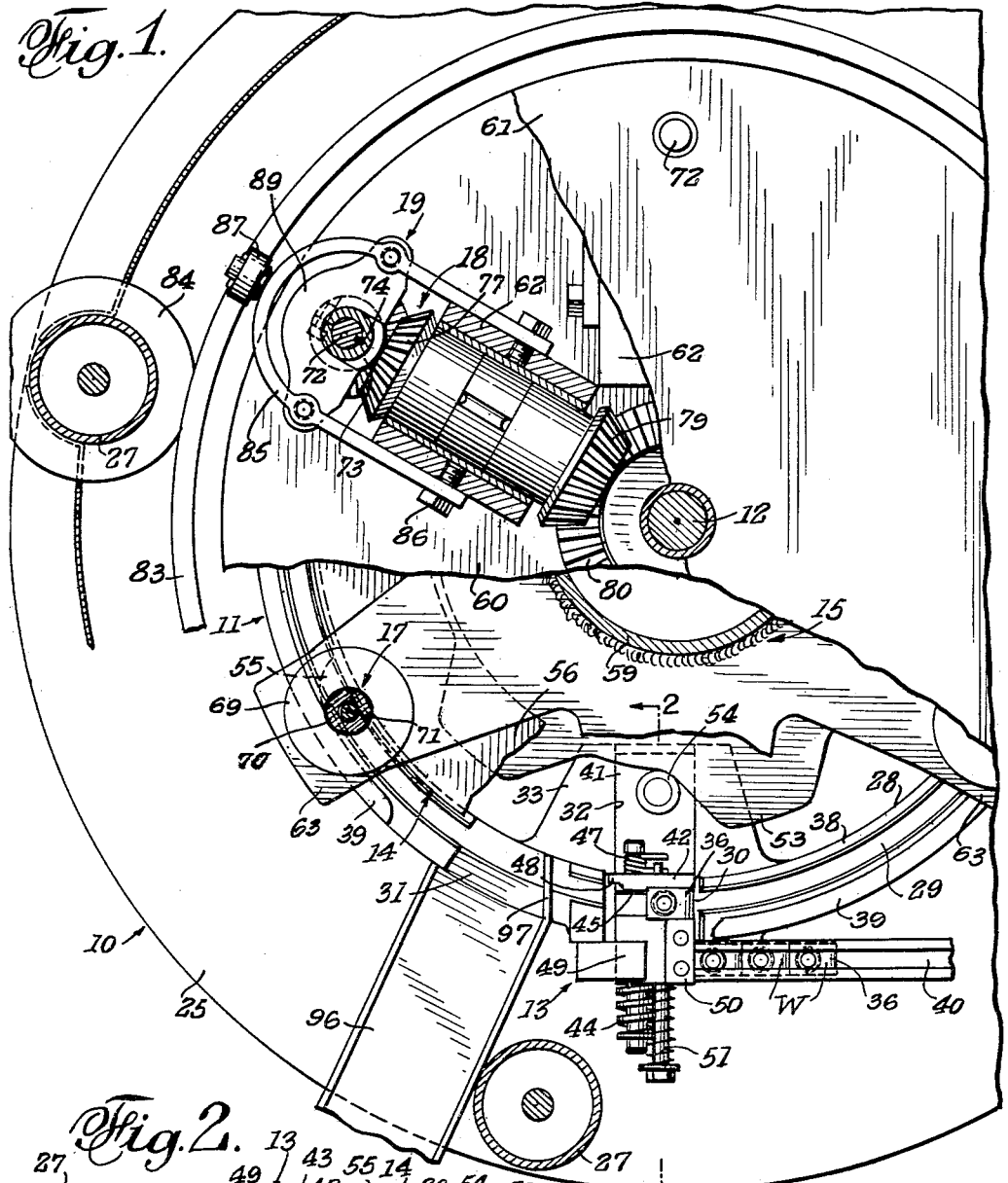
FIG. 1 is a broken plan view of a swage-tapping machine according to the present invention, the view showing several different planes from the top downward.
Figure 2:
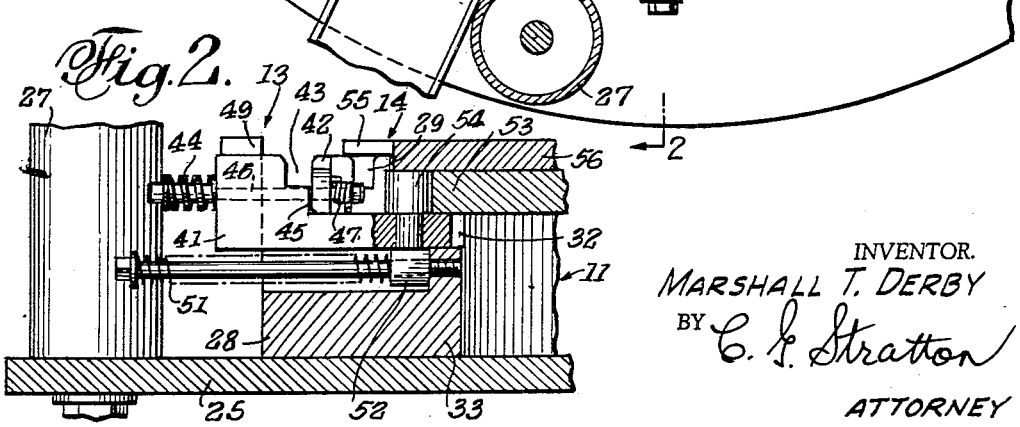
FIG. 2 is a broken cross-sectional view as taken on the line 2—2 of FIG. 1.

The swage-tapping machine that is illustrated comprises a support frame 10, a fixed circular trackway 11 carried by said frame, a driven shaft 12 disposed on the axis or center of generation of the trackway, means 13 for feeding workpieces intermittently to said trackway, means 14 for continuously moving said workpieces along the trackway, a turret 15 carrying both the means for controlling the feed of workpieces and the means 14, a drive 16 for the turret, a plurality of similar and uniformly spaced and arranged tapping units 17 carried by said turret, means 18 aligned with and operatively engaged with each respective tapping unit and controlled by the shaft 12 to operate said units, and cam-controlled means 19 for controlling the means 18 and, thereby, the feed and withdrawal rotation of the tapping units 17.

The support frame 10 is shown as comprising a base plate 25, a similar upper plate 26, and a set of posts or spacers 27 connecting said plate. The frame thus provided may be mounted on a stand, on a bench, or in any other suitable way.

The circular trackway 11 is carried by the base plate 25 and comprises a tubular member 28 in which is provided a top-open groove 29. Said groove is interrupted at the inlet or feed station of the machine, as at 30, and also at the discharge station at 31. Since said two stations are closely adjacent, as shown in FIG. 1, the circumferential extent of the groove 29 closely approximates 345°. At the inlet portion of the member 28, the same is provided with a radial groove 32 that is formed in an inreaching enlargement 33 of said member 28.

The shaft 12 extends between the frame plates 25 and 26 at the center of the trackway and has rotational bearing in said plates. The same is driven in any suitable way to provide relatively rapid rotation. The drive is here shown as bevel gearing 34 that transmits the rotation of a drive shaft 35 to the shaft 12.

The present workpiece W comprises a plate or rectangular part 36 and a tubular part 37. The latter enters the groove 29 and freely fits the same. The rectangular part 36 rests upon the top face 38 of the circular member 28 and is kept from rotating on the axis of part 37 by a rail 39 fixedly disposed on said face 38. It will be clear that the workpieces may be slid along the trackway and kept from turning by the rail 39 and from slipping laterally out of the trackway by engagement of the part 37 of the workpiece in the groove 29.

The feeding means 13 receives workpieces W from a chute 40 that is placed in tangent relation to the outside of the member 28, the same terminating at the radial groove 32. FIG. 1 shows how said chute conducts workpieces toward a feed slide 41 that operates in the groove 32. Said slide 41 carries a clamp member 42 that cooperates with the slide to form a groove 43 that is similar to groove 29. Said member 42 is resiliently biased by a spring 44 toward a shoulder 45 on the slide 41, the top of said shoulder forming the bottom of groove 43.

As seen in FIG. 6, the member 42 is carried on a stem 46 which extends through the slide 41 and is retracted by the spring 44 to cause the mentioned biasing thereof toward shoulder 45. Said member 42 is also movable around the axis of said stem 46. A torsion spring 47 biases the member to workpiece-engaging position from which position it may be depressed to move around the axis of stem 46. A tail 48 on said member 42 extends into the path of an abutment 49 affixed to the member 28. As a consequence, when the slide 41 is retracted from its feed position of FIG. 1, said tail 48 will engage abutment 49 and hold the member 42 clear of the path of movement of a workpiece from chute 40 as the slide continues its retractive movement. Thus, the groove 43 is opened wide enough to allow a workpiece to enter preparatory to being transferred from alignment with chute 40 to alignment with groove 29. A block 50 on the slide closes off feed from the chute when the slide is projected to the latter position.

The control of slide movement is provided by a spring 51 that, by pressing against a projection 52 of the slide, projects the same inwardly to feed position, and by a cam 53 that engages a follower 54 on slide 41 and causes slide retraction. In this case, the cam 53 has six operating lobes that retract the slide six times for each full rotation of the cam around the axis of shaft 12.

When a workpiece W is in feed position, as in FIG. 1, the means 14 becomes effective to slide the same from between the slide 41 and the clamp member 42 and into the groove 29. Said means 14 comprises a finger 55. There are six such fingers on a ring 56 which is fixed to the cam 53, the same moving with the cam. Said fingers are so oriented with respect to the cam lobes that one of them is in position to push on a workpiece as the latter arrives in track-groove-aligned position.

The turret 15 is best shown in FIG. 3 as comprising a lower plate 57, an upper plate 58, and a connecting tube 59. Said plates 57 and 58 have bearings through which shaft 12 extends. It is the lower plate 57 that mounts the cam 53, the later, in turn, mounting the workpiece-pushing means 14.

Said turret further includes a plate 60 secured to and extending radially outward from plate 58, and a somewhat similar plate 61 spaced thereabove by means of blocks 62 which connect the latter plates. In this case, there are six such blocks uniformly spaced around the axis of shaft 12 which extends through and has bearing in the plate 61. In addition to the foregoing, the turret 15 includes a spider plate 63 affixed to the tube 59 and located between the cam 53 and the plate 60. The spider plate is formed to have six arms, the spaces between said arms affording visual and manual access to the groove 29 and the workpieces therein.

The drive 16, in the present instance, is shown as worm and worm wheel gearing 64 that produces a relatively slow rotation of the turret with respect to the speed of shaft 12. In practice, of course, the turret speed is substantially slower than the speed of shaft 12.

Each of the six tapping units 17 is carried by an arm of spider plate 63 to be in register with the trackway groove 29 and with the tubular part 37 of a workpiece. Consequently, the axes of the units 17 are angularly related to the fingers 55 so that the desired registration between said units and workpieces is achieved.

Each unit 17 comprises a lead nut 65 loosely held in a seat 66 in spider plate 63, a radial pin 67 in said nut and engaged in a groove 68 in said plate to hold the nut non-rotationally, opposite plates 69 on the opposite sides of plate 63 retaining said nut against displacement from the latter plate, a lead screw 70 threadedly engaged in the nut 65, and a swage tap 71 affixed to and extending downwardly from the lead screw 70.

It will be clear that the axes of the units 17 are free to float within the limits of the loose fit between the nuts 65 and the seats 66. As a consequence, should there be slight misalignment between a tap 71 and the tubular part 37 therebeneath, the former may accommodate its position with the workpiece accordingly. Much wear and tap breakage is obviated by this compensating construction.

Each of the six tap-operating means 18 is axially aligned with a tap unit 17 and comprises a shaft 72 mounted for rotation in bearings in the turret plates 60 and 61, a clutch collar 73 rotational with said shaft and longitudinally adjustable therealong on a key 74, similar upper and lower pinions 75 and 76 rotationally mounted on shaft 72, a pinion 77 having common mesh with the pinions 75 and 76 and having bearing in block 62, a stub shaft 78 extending from pinion 77, and a pinion 79 on said extending end of shaft 78. The pinion 79 is in mesh with and driven by a gear 80 affixed to the shaft 12, said gear 80 driving the pinion trains of each means 18. While bevel gears have been shown, it will be understood that other gearing or means may be substituted for driving shaft 72 from shaft 12. Also, instead of the same driving speed for each pinion 75 and 76, the gear train may be varied to drive one faster than the other. Such ratio change may be resorted to to obtain a relatively slower tapping speed and a relatively faster tap-withdrawal speed.

The opposite ends of the clutch collar 73 are provided with clutch teeth or lugs 81. The ends of the gears 75 and 76 that are directed toward the clutch teeth 81 have complementary teeth or lugs 82. As a consequence, since only the collar 73 is keyed to and rotates with the shaft 72, the direction of rotation of said shaft will depend on which pinion, 75 or 76, it is clutch-connected with. It will be realized, of course, that pinion 77 drives pinions 75 and 76 in opposite directions.

The means 19 comprises a fixed cam 83 that is carried by the frame posts 27, as by collars 84, and is concentric with the turret 15 and with the trackway 11, a yoke 85 mounted on the block 62 on pivots 86 and provided with a follower 87 engaged with the cam 83, a spring 88 resiliently biasing said yoke downwardly on its pivots, a shift plate 89 engaged in an annular groove in the clutch collar, a pair of headed studs 90 affixed to opposite sides of the yoke and extending through clearance holes in said shift plate 89, and a compression spring 91 on each stud between its head and the yoke.

The springs 91 comprise resilient means that allows de-clutching movement of the clutch collar 73 relative to the clutch teeth on the gear 75, as will later be described. The spring 88, as permited by the cam 83, comprises a resilient means that effects clutching connection of the collar 73 with the pinion 76.

The lead screw 70 and the shaft 72 are connected so that the latter drives the former and the mentioned free-float movement of the tap is effected. To this end, the lead screw is provided with an upper extension 92 in which is provided an elongated slot 93, and the shaft 72 is provided with a bifurcation 94 across which extends a pin 95. The extension 92 loosely resides in the bifurcation with the pin 95 extending through the slot 93. It will be clear, therefore, that the lead screw and tap may not only rotate with the shaft 72 according to the direction that said shaft is driven, but that said screw and shaft may move axially up or down by reason of the lost motion provided.

In the present machine, the turret 15 is driven counter-clockwise as viewed from above. Also, the rotation of shaft 12 is such that pinion 75 is driven clockwise, i.e., right-hand, and pinion 76 is driven counter-clockwise, i.e., left-hand. Thus, if the lead screw 70 and tap 71 are of the right-hand, coupling of the collar 73 with pinion 75 will cause the lead screw 70 to feed downwardly, thereby causing tapping feed of the tap 71. Withdrawal of said tap, after feed, is had by coupling the collar 73 with the pinion 76. It is the cam 83 together with the lost motion connection between shaft 72 and lead screw 70 that accomplishes this operation, the cam having high and low points where desired to start tapping and to end tap withdrawal so that a workpiece may be tapped during its movement along the trackway and the tap withdrawn before the discharge station 31 is reached, by said workpiece. A discharge chute 96 may be provided for tapped workpieces which are directed to the chute by an intercepting wall 97.

The mentioned high point of cam 83 always pivotally moves the yoke 85 on its pivot 86 a distance necessary to move the clutch collar 73 into engagement with clutch teeth 82 of the gear 75, thus causing the shaft 72 to have the same endwise movement regardless of the relative longitudinal adjustment between said collar 73 and shaft 72. However, the position of the slot 93 is adjusted by suitable adjustment of the shaft 72 within clutch collar 73 to control the depth of tap feed. At the beginning of a tapping operation, the follower 87 of the yoke 85 is engaged by a rise on cam 83, causing movement of the clutch collar 73 upwardy to become coupled with gear 75. Thus, shaft 72 is moved upwardly as is the cross pin 95, the latter, thereby, moving nearer to the upper end of slot 93 than at the start of the movement of shaft 72. Upon clutching of collar 73 with gear 75, the lead screw 70 is rotated, resulting in a downward feed of said screw 70 and a tapping operation by the tap 71. This operation continues until the upper end of the slot 93 engages pin 95 and causes downward movement of shaft 72 to cause de-clutching between collar 73 and the gear 75 against the resilient bias of the springs 91. Therefore, said collar, shaft, lead screw and tap stop rotating. Thereafter the follower rides off the cam rise causing clutching of collar 73 with gear 76 by means of tension spring 88. The resulting reverse rotation causes the lead screw to run upwardly to withdraw the tap 71 from the workpiece. Return movement of the lead screw 70 stops when the lower end of slot 93 engages pin 95 and causes upward movement of shaft 72 to cause de-clutching between collar 73 and gear 76. The clutch remains in this neutral position until the cam starts the next tapping cycle by raising yoke 85.

It will be realized that because of the six-station machine provided (there may be more or fewer stations, as desired) several workpieces are being tapped at the same time. Since the cam 83 may be designed to provide for tapping throughout the whole range of travel of a workpiece, or only part of said range, the machine lends itself to incorporation of tools that perform operations on the workpieces that are not related to tapping. These optional operations may be carried out by tools placed in the machine before tapping starts or after the same is ended. Also, to test whether the workpieces are being properly placed in the groove 29 or whether said groove is clear of extraneous items that may be encountered by the lower end of the tap 71, suitable machine-stopping feeler mechanism may be provided.

This application is a division of my pending application, Serial No. 786,310.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A tapping machine comprising a circular and fixed trackway having a inlet and a discharge, a shaft normal to the trackway and disposed at the center of generation of curvature of the trackway, a turret concentric with the shaft and trackway, a drive for the shaft, an independent drive for the turret, means controlled by the turret, to intermittently feed workpieces to said trackway at said inlet, and means on the turret to slidingly move said workpieces continuously along said trackway toward the discharge thereof, said turret having a plurality of reversing tapping units in register with the workpieces during continuous rotation of the turret.

2. In a tapping machine having a plurality of reversing tap units, a turret mounting said units and concentric drive means to continuously rotate the turret aid to rotationally operate the tap means, the improvements comprising a fixed circular trackway having an inlet and a discharge for a workpiece, and concentric with said turret a workpiece-feeding unit at the inlet of the trackway, means provided on said turret to intermittently operate the feeding unit to intermittently feed workpieces onto the trackway, means carried by the turret and extending over the trackway to engage and slidingly move workpieces fed to the trackway by the feeding unit, means to retain the workpieces non-rotational during movement thereof along the trackway, the workpiece-moving means and the reversing tap units being so oriented that the former means, while moving workpieces, disposes them in register with the tap units, and means adjacent the inlet at the discharge of the trackway to dislodge workpieces after the same have been tapped by the tap units.

3. In a tapping machine according to claim 2, the tap units being uniformly circumferentially spaced around the turret, and the means to move the workpiece being circumferentially offset from the centers of the tap units to locate the workpieces in axial register with the tap units.

References Cited in the file of this patent
UNITED STATES PATENTS

| | | |
|---|---|---|
| 327,533 | Cross | Oct. 6, 1885 |
| 1,141,779 | Daniels et al. | June 1, 1915 |
| 1,358,553 | Hull | Nov. 9, 1920 |
| 1,440,646 | Swanson | Jan. 2, 1923 |
| 2,436,820 | Nordquist et al. | Mar. 2, 1948 |
| 2,729,833 | Nielsen | Jan. 10, 1956 |
| 2,802,224 | Hillman | Aug. 13, 1957 |